US010717656B2

(12) United States Patent
Allemand et al.

(10) Patent No.: US 10,717,656 B2
(45) Date of Patent: Jul. 21, 2020

(54) METHOD FOR PREPARING A MATERIAL MADE FROM ALUMINOSILICATE AND METHOD FOR PREPARING A COMPOSITE MATERIAL HAVING AN ALUMINOSILICATE MATRIX

(71) Applicants: COMMISSARIAT A L'ENERGIE ATOMIQUE ET AUX ENERGIES ALTERNATIVES, Paris (FR); Centre National De La Recherche Scientifique, Paris (FR)

(72) Inventors: Alexandre Allemand, Bordeaux (FR); Philippe Belleville, Tours (FR); Yann Le Petitcorps, Leognan (FR); Romain Billard, Epernay (FR); Mickael Dolle, Flesselles (FR)

(73) Assignees: COMMISSARIAT ÀL'ÉNERGIE ATOMIQUE ET AUX ÉNERGIES ALTERNATIVES, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 336 days.

(21) Appl. No.: 15/545,027

(22) PCT Filed: Jan. 21, 2016

(86) PCT No.: PCT/EP2016/051241
§ 371 (c)(1),
(2) Date: Jul. 20, 2017

(87) PCT Pub. No.: WO2016/116564
PCT Pub. Date: Jul. 28, 2016

(65) Prior Publication Data
US 2018/0009669 A1 Jan. 11, 2018

(30) Foreign Application Priority Data

Jan. 23, 2015 (FR) ..................... 15 50541

(51) Int. Cl.
*C04B 35/64* (2006.01)
*C04B 35/80* (2006.01)
(Continued)

(52) U.S. Cl.
CPC ............ *C01B 33/26* (2013.01); *C04B 35/195* (2013.01); *C04B 35/62625* (2013.01);
(Continued)

(58) Field of Classification Search
CPC ............ C04B 35/195; C04B 2235/666; C04B 2235/3218
See application file for complete search history.

(56) References Cited

U.S. PATENT DOCUMENTS 6,620,751 B1 * 9/2003 Ogunwumi ........... C04B 35/478
501/128
8,529,851 B2 * 9/2013 Torrecillas San Millan ................
C04B 35/19
423/118.1
(Continued)

FOREIGN PATENT DOCUMENTS

EP 2371786 A1 10/2011
FR 2998295 A1 11/2012
(Continued)

OTHER PUBLICATIONS

English language translation of JP 62-071535 A (Nagamine et al.), Apr. 2, 1987. Translation by Schreiber Translations, Inc., Dec. 2019. (Year: 1987).*
(Continued)

*Primary Examiner* — Erin Snelting
(74) *Attorney, Agent, or Firm* — Pearne & Gordon LLP (57) ABSTRACT

The invention relates to a method for preparing a material based on an aluminosilicate selected from barium aluminosilicate BAS, barium-strontium aluminosilicate BSAS, and strontium aluminosilicate SAS, said aluminosilicate consisting of aluminosilicate with a hexagonal structure, characterised in that it includes a single sintering step in which a mixture of powders of precursors of said aluminosilicate, including an aluminium hydroxide $Al(OH)_3$ powder, are sintered by a hot-sintering technique with a pulsed electric field SPS; whereby a material based on an aluminosilicate, said aluminosilicate consisting of an aluminosilicate with a hexagonal structure is obtained. The material based on an aluminosilicate prepared by said method can be used in a method for preparing a composite material consisting of an aluminosilicate matrix reinforced by reinforcements made of metalloid or metal oxide.

29 Claims, 6 Drawing Sheets

(51) Int. Cl.

| | |
|---|---|
| C04B 35/195 | (2006.01) |
| C04B 35/626 | (2006.01) |
| C04B 35/78 | (2006.01) |
| C01B 33/26 | (2006.01) |
| C04B 35/63 | (2006.01) |
| H01Q 1/42 | (2006.01) |

(52) U.S. Cl.
CPC .......... *C04B 35/6303* (2013.01); *C04B 35/64* (2013.01); *C04B 35/78* (2013.01); *C04B 35/803* (2013.01); *H01Q 1/42* (2013.01); *C01P 2002/72* (2013.01); *C01P 2004/03* (2013.01); *C01P 2006/32* (2013.01); *C04B 2235/3213* (2013.01); *C04B 2235/3215* (2013.01); *C04B 2235/3217* (2013.01); *C04B 2235/3418* (2013.01); *C04B 2235/3481* (2013.01); *C04B 2235/44* (2013.01); *C04B 2235/442* (2013.01); *C04B 2235/5224* (2013.01); *C04B 2235/5228* (2013.01); *C04B 2235/5244* (2013.01); *C04B 2235/5252* (2013.01); *C04B 2235/5276* (2013.01); *C04B 2235/5436* (2013.01); *C04B 2235/5481* (2013.01); *C04B 2235/616* (2013.01); *C04B 2235/656* (2013.01); *C04B 2235/6562* (2013.01); *C04B 2235/6565* (2013.01); *C04B 2235/6567* (2013.01); *C04B 2235/666* (2013.01); *C04B 2235/72* (2013.01); *C04B 2235/76* (2013.01); *C04B 2235/767* (2013.01); *C04B 2235/77* (2013.01); *C04B 2235/785* (2013.01); *C04B 2235/81* (2013.01)

(56) References Cited

U.S. PATENT DOCUMENTS

| | | |
|---|---|---|
| 2009/0269573 A1 | 10/2009 | Omori et al. |
| 2011/0301016 A1* | 12/2011 | Torrecillas San Millan ................ C04B 35/19 501/153 |
| 2012/0309609 A1* | 12/2012 | Torrecillas San Millan ................ C04B 35/19 501/134 |
| 2013/0337994 A1* | 12/2013 | Torrecillas San Millan ................ C04B 35/19 501/153 |

FOREIGN PATENT DOCUMENTS

| | | |
|---|---|---|
| JP | S62-71535 A | 4/1987 |
| WO | 2014079837 A1 | 5/2014 |

OTHER PUBLICATIONS

Amritphale, S. S., et al., "Development of celsian ceramics from fly ash useful for X-ray radiation-shielding application", "Journal of the European Ceramic Society", Jun. 13, 2007, pp. 4639-4647, vol. 27.
Billard, R., et al., "Recueil des Resumes Colloque 17", "Confrence Pluridisciplinaire sur les matriaux 2014", Nov. 24, 2014, pp. 1-117; https://secure.key4events.com/key4register/images/client/239/files/RecueilR%C3%A9sum%C3%A9s_17.pdf.
Boskovic, S., et al., "Formation of celsian from mechanically activated BaCO3Al2O3SiO2 mixtures", "Journal of Alloys and Compounds", Feb. 1999, pp. 230-235, vol. 290.
Drummond, III, C. H., et al., "Crystallization Behavior and Properties of BaO Al2O3 2SiO2 Glass Matrices", "Ceramic Engineering and Science Proceedings", Feb. 1990, pp. 124, vol. 11, No. 7-8.
Kremenovic, A., et al., "Structural and spectroscopic characterization of the quenched hexacelsian", "Journal of Physics and Chemistry of Solids", May 6, 2003, pp. 2253-2268, vol. 64.
Lee, K.-T., et al., "Synthesis of Hexacelsian Barium Aluminosilicate by a Solid-State Process", "Journal of the American Ceramic Society", Dec. 2000, pp. 2907-2912, vol. 83, No. 12.
Lee, K.-T., et al., "Enhanced production of celsian barium aluminosilicates by a three-step firing technique", "Materials Chemistry and Physics", Aug. 2001, pp. 47-52, vol. 71.
Long-Ganzalez, D., et al., "Synthesis of monoclinic Celsian from Coal Fly Ash by using a one-step solid-state reaction process", "Ceramics International", Nov. 5, 2009, pp. 661-672, vol. 36.
Shabanova, G. N.. et al., "Structure of the BaO Al2O3 SiO2 System (A Review)", "Glass and Ceramics", Feb. 15, 2003, pp. 43-46, vol. 60, No. 1-2.
Talmy, I. G., et al., "Celsian-based (BaO Al2O3 2SiO2) Ceramics as Candidates for Radomes", "Proceedings of the 14th Conference on Metal Carbon and Ceramic Composites", 1990, pp. 1-11.
Ye, F., et al., "Synthesis of 30 wt%BAS/Si3N4 composite by spark plasma sintering", "Composites Science and Technology", Jul. 12, 2007, pp. 1073-1079, vol. 68.
Zaykoski, J. A., et al., "Galliu, and Germanium Substitutions in Celsian", "Ceramic Engineering and Science Proceedings", 1994, pp. 779-786, vol. 9-10.
NOTE: For the non-patent literature citations that no month of publication is indicated, the year of publication is more than 1 year prior to the effective filing date of the present application.

* cited by examiner

METHOD FOR PREPARING A MATERIAL MADE FROM ALUMINOSILICATE AND METHOD FOR PREPARING A COMPOSITE MATERIAL HAVING AN ALUMINOSILICATE MATRIX

CROSS-REFERENCE TO RELATED APPLICATIONS

This application is a U.S. national phase under the provisions of 35 U.S.C. § 371 of International Patent Application No. PCT/EP16/51241 filed Jan. 21, 2016, which in turn claims priority of French Patent Application No. 1550541 filed Jan. 23, 2015. The disclosures of such international patent application and French priority patent application are hereby incorporated herein by reference in their respective entireties, for all purposes.

TECHNICAL FIELD

The invention relates to a method for preparing a material based on aluminosilicate.

More specifically, the invention relates to a method for preparing a material based on an aluminosilicate selected from among barium aluminosilicate BAS, barium and strontium aluminosilicate BSAS, and strontium aluminosilicate SAS.

By a material based on aluminosilicate, is generally understood a material comprising 80% by mass or more, preferably further 100% by mass of aluminosilicate such as barium aluminosilicate.

Barium aluminosilicate which may be defined as a ceramic material of the oxide type fits the formula $BaAl_2Si_2O_8$ and is also generally designated by the acronym BAS which will be used in the following.

The invention further relates to a method for preparing a composite material with an aluminosilicate matrix, notably made of barium aluminosilicate reinforced by reinforcements made of metal oxide.

The thereby prepared composite material notably finds its application in the aeronautical or aerospace field, for example for the manufacturing of radomes.

STATE OF THE PRIOR ART

BAS has many properties which make it an interesting material for multiple applications. Thus, the BAS is known for having a low thermal expansion coefficient [1] excellent resistance to oxidation and to reduction [1], stable dielectric properties [2], strong opacity to X-rays [3], and a high melting temperature of the order of 1,760° C.

The BAS may be put in the form of a monolith or else it may be integrated into a composite material [4] & [4A].

BAS is encountered in the literature in two main crystalline forms, i.e.: the "Celsian" or monoclinic form, and the "Hexacelsian" or hexagonal form (hexagonal structure of Celsian). There also exists a minor orthorhombic structure.

The monoclinic Celsian form is stable up to 1,590° C. and benefits from a low thermal expansion coefficient (from $2.3 \cdot 10^{-6\circ}$ $C.^{-1}$ for its vitroceramic form [5] to $4.5 \cdot 10^{-6\circ}$ $C.^{-1}$ for its monolithic form [6]).

This low thermal expansion coefficient makes this monoclinic form compatible with materials such as SiC or $Si_3N_4$ [7]. However, it is the Hexacelsian form, hexagonal form which is mainly formed under normal conditions without additions of the Sr, Ca, Mg, Li type.

The Hexacelsian, hexagonal form is stable between 1,590° C. and 1,750° C. and becomes metastable between 300° C. and 1,590° C.

This hexagonal form has a much greater dilatation coefficient ($8.10^{-6\circ}$ $C.^{-1}$) and consequently, it is not compatible with the aforementioned reinforcements. On the other hand, this expansion coefficient is much closer to that of alumina, for example which is close to $8.10^{-6\circ}$ $C.^{-1}$.

Moreover, the Hexacelsian form has a polymorphism around 300° C. The lattice passes from a hexagonal structure to an orthorhombic structure with a volume variation of the order of 3%.

However, it is possible to carry out a quench in order to set the hexagonal structure [8].

Among the preparation elaboration methods, of the BAS, a distinction may be made between the conventional preparation methods and the preparation, elaboration methods from hydroxide.

Conventional Preparation Methods.

A large variety of methods have been studied and developed for synthesizing BAS.

The goal of the quasi-totality of the studied methods is to obtain BAS in the monoclinic form called "Celsian".

Document of Kuo-Tong Lee et al. [9] gives a complete view of the whole of the methods for preparing BAS.

According to this document which analyzes about thirty prior studies, works, it is possible to elaborate BAS with a sol-gel method, by sintering of a mixture of oxides, by oxidation of a solid metal, or else by a conventional method for elaborating glasses.

The following table 1 stemming from the document of Kuo-Tong Lee [9] summarizes the characteristics of the main methods used for preparing BAS.

Thus Table 1 indicates the various precursors and heat treatments used in each of these methods, and the phase(s) present in the final product obtained at the end of each of these methods.

TABLE 1

| Precursor(s) | Heat treatment | Phase(s) present* |
|---|---|---|
| Molten BAS glasses | 1,290° C. for 4 h | H |
| Idem + 5% by mass of $LiO_2$ | 1,220° C. for 4 h | C (M) + mullite + glass |
| Molten glass of cold-compressed BAS | 1,300° C. for 20 h | C |
| BAS gel | 1,080° C. | H (m) + glass |
| Idem | 1,320° C. for 4 weeks | C |
| Idem + 2.5% by moles of $LiO_2$ | 1,100° C. for 2 min | C |
| Idem + 5% by mass of $LiO_2$ | 1,020° C. | C |
| Kaolin + $BaCO_3$ | 1,350° C. for 24 h | C |
| Idem + 5% by moles of LiF | 1,200° C. for 6 h | C |
| $BaCO_3$ + $Al_2O_3$ + $SiO_2$ | 1,250° C. for 5 h | H |
| Idem | 1,500° C. for 150 h | C |
| Topaz + $BaCO_3$ | 900° C. | C |
| Zeolite doped with Ba | 950° C. for 4 h | H(m) + glass |
| Idem | 1,550° C. for 20 h | C |
| Ba + Al + $Al_2O_3$ + $SiO_2$ | 1,200° C. for 35 h | H(m) + $BaAl_2O_4$ |
| Idem | 1,580° C. for 35 h | H + C(M) |

*H = Hexacelsian,
C = Celsian,
M = majority phase,
m = minority phase

The studies exposed in the aforementioned document [9], in another document of Kuo-Tong Lee (document [10]), as well as in document of I. G. Talmy [11] put forward the interest of using precursors in the form of alumina powders $Al_2O_3$, of silica powders $SiO_2$, and of barium carbonate powders $BaCO_3$. The purest BAS phases are obtained after two successive heat treatments.

Thus, in the methods for preparing BAS which comprise two successive heat treatments, a first step consists of mixing the $BaCO_3$ and $SiO_2$ powders and of treating this mixture at 1,150° C. for 4 hours. A second step consists of recovering the compound formed at the end of the first step, and of mixing it with $Al_2O_3$ and then treating the whole at 1,200° C. for 6 hours. Both heat treatments are accomplished in a tubular oven with air. This method gives a quasi pure BAS in a crystallized hexagonal form. It is possible to obtain the Celsian form by carrying out a third heat treatment between 1,200° C. and 1,530° C. for several hours.

This method is applied in documents [4] and [4A], in order to prepare an aluminosilicate powder, notably made of BAS comprising in majority by mass the BAS with a hexagonal structure, which is used for producing composite materials consisting of a barium aluminosilicate matrix reinforced with reinforcements made of a metal or metalloid oxide.

Most of the methods discussed in the foregoing have the main drawback that when preparing BAS with a hexagonal structure is preferentially desired, two successive steps of heat treatment carried out in a tubular oven in air are required.

Two more recent documents apply flying ashes of coal ("Coal Fly Ash" or CFA) [3] [12]. The "CFAs" are wastes from coal burning power plants which mainly contain, as chemical compounds, silica and alumina in the form of mullite ($Al_6Si_2O_{13}$) and of quartz, as well as an amorphous phase.

The document of Long-Gonzalez [12] shows that it is possible to synthesize in a single step BAS in the Celsian form or in the Hexacelsian form. The substitution of Ba with Sr promotes the formation of the Celsian form to the expense of the Hexacelsian form.

The manufacturing method of this document consists of mixing CFAs with alumina and barium carbonate (optionally strontium carbonate) and then cold pressing this mixture in a unidirectional press. The obtained samples are then heat treated for 5 hours in a range of temperatures comprised between 850° C. and 1,300° C. This method has the major drawback of giving multiphase samples, notably with $BaSiO_3$, $Ba_2SiO_4$, $BaSi_2O_5$, as well as all the impurities initially present in the ashes.

Preparation Methods from Hydroxide.

Only a single document treating with the elaboration of BAS from aluminium hydroxide was found.

This is document JP-A-S62-71535 of Nagamine Shogo [13]. In this document, an intimate mixture of BAS and $BaAl_{12}O_{19}$ particles is obtained from aluminium hydroxide and from a compound rich in Ba capable of giving an oxide. Both of these constituents are heat treated in a first step in order to obtain $BaAl_{12}O_{19}$. Next, in a second step, the $BaAl_{12}O_{19}$ is mixed either with Kaolin, or with BAS (in a monoclinic form), or with feldspar. This mixture is treated at a high temperature in order to obtain a mixture of BAS and $BaAl_{12}O_{19}$ particles. This material is used as a catalyst support since it is extremely refractory.

This method has the major drawback of giving non-homogeneous samples with the presence of $BaAl_{12}O_{19}$.

Therefore there exists, considering the foregoing, a need for a preparation method of a material based on an aluminosilicate, said aluminosilicate such as BAS consisting of (100% by mass) of an aluminosilicate with a hexagonal structure, which comprises a limited number of heat treatment steps, preferably a single heat treatment step.

There also exists a need for a method for preparing a material based on an aluminosilicate, such as barium aluminosilicate, said aluminosilicate such as BAS consisting of (100% by mass) of an aluminosilicate with a hexagonal structure, which gives the possibility of obtaining a homogeneous material for example comprising at least 80% by mass of a dense, and non-cracked aluminosilicate, such as barium aluminosilicate.

The goal of the present invention is inter alia to meet these needs.

The goal of the present invention is further to provide a method for preparing a material based on an aluminosilicate, such as barium aluminosilicate, said aluminosilicate such as BAS consisting (100% by mass) of an aluminosilicate of a hexagonal structure which does not have the drawbacks, limitations, defects, and disadvantages of the methods of the prior art such as the methods discussed above and which solves the problems of these methods.

DISCUSSION OF THE INVENTION

This goal and further other ones, are achieved, according to the invention by a method for preparing a material based on an aluminosilicate selected from among barium aluminosilicate BAS, barium and strontium aluminosilicate BSAS, and strontium aluminosilicate SAS, said aluminosilicate consisting of aluminosilicate with a hexagonal structure, characterized in that it comprises a single sintering step wherein the sintering of a mixture of powders of precursors of said aluminosilicate comprising a powder of aluminium hydroxide $Al(OH)_3$ is carried out, by a hot sintering technique with a pulsed electric field SPS; whereby a material based on an aluminosilicate, said aluminosilicate consisting of aluminosilicate with a hexagonal structure is obtained.

The aluminosilicate is therefore selected from among barium aluminosilicate BAS, barium and strontium aluminosilicate BSAS, and strontium aluminosilicate SAS.

By a mixture of powders of precursors of the aluminosilicate, is meant a mixture of powders of compounds which during the sintering with SPS react together in order to give the aluminosilicate.

The man skilled in the art may easily select according to the aluminosilicate to be obtained, the powders of adequate precursors which will give the desired aluminosilicate during sintering with SPS, being aware that according to the invention, the mixture of powders of precursors mandatorily comprises a powder of aluminium hydroxide $Al(OH)_3$.

The powders of precursors other than the aluminium hydroxide powder $Al(OH)_3$ may be selected from among powders of barium carbonate $BaCO_3$, of silica $SiO_2$, and of strontium carbonate.

Generally, the mixture of precursors powders may not comprise alumina.

Preferably, the aluminosilicate is the barium aluminosilicate BAS and the mixture of powders of precursors then comprises, preferably consists of, a mixture of a barium carbonate powder $BaCO_3$, of a silica powder $SiO_2$, and of an aluminium hydroxide powder $Al(OH)_3$ The method according to the invention has never been described or suggested in the prior art as notably shown by the documents studied above.

The method according to the invention is fundamentally distinguished from the methods for preparing BAS of the prior art, by at least three essential characteristics.

According to a first characteristic, the method according to the invention comprises only one heat treatment step, in other words, a single heat treatment step, achieved by SPS, by which the desired aluminosilicate such as BAS is directly obtained.

Because it comprises a single heat treatment step, the method according to the invention thereby overcomes one of the main problems of the methods of the prior art which apply two successive steps for the heat treatment.

According to a second characteristic of the method according to the invention, the aluminosilicate, such as BAS, is prepared from a specific mixture of powders of precursors, i.e. a mixture of powders of precursors characterized in that it comprises an aluminium hydroxide $Al(OH)_3$ powder.

For example, in the case when a material based on BAS is prepared, the mixture of powders of precursors is a mixture of a barium carbonate $BaCO_3$ powder, of a silica powder $SiO_2$, and of an aluminium hydroxide $Al(OH)_3$ powder.

Finally, according to a third characteristic of the method according to the invention, the single heat treatment step is carried out by a specific technique, i.e. a hot sintering technique with a pulsed electric field SPS.

The preparation of BAS, a fortiori BAS comprising a majority by mass of barium aluminosilicate of a hexagonal structure from aluminium hydroxide $Al(OH)_3$ is neither described, nor suggested in the prior art.

In other words, the use of aluminium hydroxide as an initial precursor product for the preparation of BAS is neither described nor suggested in the prior art.

Surprisingly, it is specifically aluminium hydroxide, which mixed with the other precursors, such as barium carbonate $BaCO_3$ and silica $SiO_2$, for example crystallized silica, that it is possible to describe as conventional precursors, gives the possibility, by means of heat treatment with SPS, of obtaining in a single step a material based on aluminosilicate, such as BAS, and especially a material based on aluminosilicate, such as BAS, wherein the BAS consists of the aluminosilicate of hexagonal structure, and said material being homogeneous, dense and non-cracked.

The preparation of an aluminosilicate, such as BAS by using the hot sintering technique with a pulsed electric field ("Spark Plasma Sintering" or "SPS") was not described in the prior art. A fortiori, the preparation of an aluminosilicate, such as the BAS of hexagonal structure by using the SPS technique, and by applying a mixture of specific powders containing aluminium hydroxide, was not described in the prior art.

There exist documents which describe the elaboration with the SPS technique of composite materials with a BAS matrix and with $Si_3N_4$ reinforcements [7] or else with reinforcements made of metal oxide [4] and [4A].

But, in these documents, the SPS technique is used for preparing composite materials from BAS synthesized beforehand and not for preparing this BAS.

The document of Feng Ye [7] consists of growing elongated grains of $Si_3N_4$ in a glassy matrix of BAS. A conventional heat treatment is required in order to then crystallize BAS. In the obtained material, the BAS is a minority, it represents 30% by mass.

In documents [4] and [4A], the SPS technique is used for densifying a mixture of aluminosilicate powder, notably BAS powder prepared beforehand, and of reinforcements made of metal oxide and thereby preparing a composite material. The BAS used is the BAS obtained by a conventional dual heat treatment method, identical with the method described in document [10], and not of BAS obtained by an SPS technique.

Finally, there is no mention, nor suggestion in the prior art that a barium aluminosilicate, such as BAS, may be elaborated in a single step by SPS from aluminium hydroxide. Surprisingly, it is just by using aluminium hydroxide as a precursor of the aluminosilicate, such as BAS, associated with the application of the SPS technique, which gives the possibility for the first time, of synthesizing in a single step an aluminosilicate such as BAS, which further gives the possibility of obtaining an aluminosilicate such as the BAS consisting of the aluminosilicate of hexagonal structure, and which finally gives the possibility of preparing a material based on an aluminosilicate, such as BAS, which is homogeneous (by homogeneous is meant that the material according to the invention comprises at least 80% by mass of aluminosilicate, such as barium aluminosilicate, and that this aluminosilicate is uniformly distributed in the whole of the material), dense (by dense is meant that the material according to the invention generally has a density greater than 95% of the theoretical density), and non-cracked.

In other words, according to the invention it is shown surprisingly that in order to obtain in a single step an aluminosilicate such as BAS, it is necessary to use aluminium hydroxide and sintering by SPS.

Surprisingly it was shown according to the invention that the association of this specific precursor and of this specific sintering technique gave the possibility of obtaining in a single sintering step a material based on an aluminosilicate, such as BAS, said BAS consisting of BAS of hexagonal structure, and said material being homogeneous, dense, and non-cracked.

Indeed, as shown by the examples which follow by conventionally using alumina and sintering in a tubular oven, a very heterogeneous material consisting only of BAS for a half, is obtained. If the alumina is used with sintering by SPS, this leads to the melting of the material, and finally if aluminium hydroxide is used with conventional sintering, this also leads to a very heterogeneous sample.

Advantageously (in the case when the prepared aluminosilicate is barium aluminosilicate BAS), the molar ratio of the barium carbonate $BaCO_3$ powder, of the silica $SiO_2$ powder, and of the aluminium hydroxide $Al(OH)_3$ powder in the mixture of powders of precursors is of 1 mole of $BaCO_3$ for 2 moles of silica $SiO_2$ and 2 moles of aluminium hydroxide $Al(OH)_3$.

Advantageously, the mixture of powders of precursors, for example the mixture of the barium carbonate $BaCO_3$ powder, of the silica $SiO_2$ powder, and of the aluminium hydroxide $Al(OH)_3$ powder is prepared by suspending the powders in a solvent, by homogenizing the suspension, and by drying the suspension.

The solvent may be selected from alcohols, preferably from among aliphatic alcohols of 1 to 10 C, such as ethanol; water; and mixtures thereof.

Preferably, the solvent is water at a basic pH, preferably at a pH from 10 to 12, for example 11.

It was ascertained (see example 5) that the use of a basic medium during the preparation of the mixture of the powders gives the possibility of obtaining a more homogeneous microstructure of the final material.

Water with a basic pH generally contains a base, which is preferably ammonia.

Or else, the solvent may be water at an acid pH, for example a pH of 4.

Advantageously, during the sintering, a first plateau may be observed at a first temperature for removing water aimed in the aluminium hydroxide $Al(OH)_3$, a second optional plateau may be observed at a second temperature for forming intermediate compounds (from among which for example $BaSi_2O_5$), and a third plateau may be observed at a third temperature for forming the aluminosilicate such as BAS.

Preferably:

The first plateau is carried out at a temperature from 900° C. to 1,000° C., for example 900° C., for a duration of 1 to 5 minutes, for example 1 minute;

The second plateau is carried out at a temperature from 1,100° C. to 1,200° C., for example 1,100° C., for a period from 0 to 20 minutes, preferably from 1 to 20 minutes, for example 10 minutes;

The third plateau is carried out at a temperature from 1,200° C. to 1,700° C., for example 1,200° C., for a period from 1 to 20 minutes, for example 10 minutes.

Advantageously, the material based on an aluminosilicate, such as barium aluminosilicate BAS, prepared, is dense (i.e. it generally has a density of more than 95% of the theoretical density), homogeneous, and non-cracked.

The method according to the invention may further comprise a step during which the material based on an aluminosilicate, consisting of aluminosilicate with a hexagonal structure, is heat-treated for transforming the aluminosilicate with a hexagonal structure into an aluminosilicate with an orthorhombic structure, or into an aluminosilicate with a monoclinic structure.

In other words, the phase of the aluminosilicate, such as BAS of the material obtained according to the invention is hexagonal and it is easy for the man skilled in the art, if desired, to carry out a conventional heat treatment for transforming the hexagonal phase into a monoclinic phase.

The invention also relates to a method for preparing a composite material, consisting of a matrix made of at least one aluminosilicate, reinforced with reinforcements made of at least one metal or metalloid oxide for which the thermal expansion coefficient is close to the one of said at least one aluminosilicate, wherein the following successive steps are carried out:

a) a material based on an aluminosilicate is prepared with the method according to the invention as described above, and a powder of said material based on an aluminosilicate is prepared;

b) the powder of the material based on an aluminosilicate is put into contact with reinforcements made of at least one metal or metalloid oxide, for which the thermal expansion coefficient is close to that of the aluminosilicate;

c) sintering of the powder of the material based on an aluminosilicate and of the reinforcements made of at least one metal or metalloid oxide is achieved by a hot sintering method with a pulsed electric field;

d) the sintered powder and reinforcements are cooled;

e) the composite material is recovered.

By metal or metalloid oxide for which the expansion coefficient is close to that of the at least one aluminosilicate, is generally meant that the thermal expansion coefficient of the metal or metalloid oxide differs from the expansion coefficient of the aluminosilicate by not more than 10%, preferably by not more than 5%, still preferably not more than 1%.

The aluminosilicate is selected from among barium aluminosilicate BAS, barium and strontium aluminosilicate BSAS, and strontium aluminosilicate SAS.

Preferably, the aluminosilicate is barium aluminosilicate BAS.

The aluminosilicate such as BAS, may consist of an aluminosilicate such as BAS, of hexagonal structure, in which case the reinforcements are generally made of alumina.

Or else, the aluminosilicate such as BAS, consists of aluminosilicate such as BAS, of a monoclinic structure, in which case the reinforcements are generally made of SiC or of $Si_3N_4$.

Advantageously, the reinforcements made of at least one metal or metalloid oxide may appear in one or several form(s) selected from among particles such as long fibers and short fibers also called trichites or whiskers; and fiber fabrics.

During step b), it is possible to prepare a mixture of the powder of an aluminosilicate, such as barium aluminosilicate powder, and of particles made of at least one metal or metalloid oxide; or else, during step b), a fiber fabric made of at least one metal or metalloid oxide is impregnated with a slurry of the powder of at least one aluminosilicate, such as a barium aluminosilicate powder.

The method for preparing a composite material according to the invention is different from the methods for preparing such a composite material of the prior art, by the fact that it comprises a step a) during which a material based on an aluminosilicate is prepared by the method according to the invention as described above. Consequently, the method for preparing a composite material according to the invention has, inherently, all the advantages related to the application of this step a) by the method for preparing a material based on an aluminosilicate according to the invention.

BRIEF DESCRIPTION OF THE DRAWINGS

Other features and advantages of the invention will become better apparent upon reading the description which follows, given as an illustration and as non-limiting with reference to the appended Figures, wherein.

In abscissas is plotted the time (in minutes) and in ordinates is plotted the temperature (in ° C.).

The scale plotted in FIG. 3A represents 500 μm.

The scale plotted in FIG. 3B represents 50 μm.

In abscissas is plotted 2 Theta (°), and in ordinates is plotted Lin (in counts/s).

The scale plotted in FIG. 5A represents 500 μm.

The scale plotted in FIG. 5B represents 50 μm.

In abscissas is plotted 2 Theta (in °), and in ordinates is plotted Lin (in counts/s).

The scale plotted in FIG. 7A represents 500 µm.
The scale plotted in FIG. 7B represents 50 µm.

In abscissas is plotted 2 Theta (in °), and in ordinates is plotted Lin (in counts/s).

The scale plotted in FIG. 9A represents 500 µm.
The scale plotted in FIG. 9B represents 50 µm.

In abscissas is plotted 2 Theta (in °), and in ordinates is plotted Lin (in counts/s).

The scale plotted in FIG. 10A represents 500 µm.
The scale plotted in FIG. 10B represents 50 µm.

In abscissas is plotted 2 Theta (in °), and in ordinates is plotted Lin (in counts/s).

DETAILED DISCUSSION OF PARTICULAR EMBODIMENTS

The following description of the method according to the invention for preparing an aluminosilicate is rather made with reference to the preparation of barium aluminosilicate. But it is quite obvious that this description may easily be adapted by the man skilled in the art, to the preparation of other aluminosilicates, whatever they may be such as for example barium and strontium aluminosilicate BSAS, or strontium aluminosilicate SAS.

The initial product for preparing BAS is a mixture of a barium carbonate $BaCO_3$ powder, of a silica $SiO_2$ powder, and of an aluminium hydroxide $Al(OH)_3$ powder.

There-again, it is quite obvious that the selection of the powders which make up the mixture will easily be adapted to the preparation of aluminosilicates other than BAS, however provided that the powder mixture contains aluminium hydroxide $Al(OH)_3$.

Silica is preferably crystallized silica, as quartz. The silica powders used are generally commercial powders with high purity, i.e. generally greater than or equal to 99%.

The average grain size of the silica and barium carbonate powders is generally from 0.5 to 10 µm, preferably from 2 to 5 µm.

The grain size of the aluminium hydroxide powder $Al(OH)_3$ is generally from 0.5 to 10 µm, preferably from 2 to 5 µm.

In this mixture of powders for preparing BAS, the molar ratio of the barium carbonate $BaCO_3$ powder, of the silica $SiO_2$ powder, and of the aluminum hydroxide powder $Al(OH)_3$ is preferably 1 mole of $BaCO_3$, 2 moles of silica $SiO_2$, and 2 moles of aluminum hydroxide $Al(OH)_3$.

Preferably, the mixture of the barium carbonate $BaCO_3$ powder, of the silica $SiO_2$ powder, and of the aluminium hydroxide $Al(OH)_3$ powder is prepared by suspending the powders in a solvent, by homogenizing the suspension, and by drying the suspension.

The preparation of the mixture of powders begins with weighing the different powders in a same container.

A solvent is then added to the powders contained in this same container in order to obtain a suspension or dispersion of said powders. This suspension or dispersion preferably has a concentration from 50 to 100 g/L.

The solvent may be selected from among alcohols, preferably among aliphatic alcohols with 1 to 10 C such as ethanol; water; and mixtures thereof.

A preferred solvent is water at a basic pH, preferably at a pH from 10 to 12, for example 11.

In order to obtain such a pH, the water contains a base which is for example ammonia.

The suspension, dispersion of powders is then homogenized.

This homogenization may be carried out with any adequate technique known to the man skilled in the art.

For example, this homogenization may be carried out under the action of ultrasonic waves, by means of an ultrasonic processor.

Thus, the homogenization of the dispersion, solution may be carried out by means of a ultrasonic processor Vibrocell® 75401, for example operating for 4 minutes at 30% power with 2 seconds of activity and 2 seconds of standstill.

The suspension, dispersion is then dried.

This drying may be achieved with any adequate technique known to the man skilled in the art. For example, the drying of the suspension, dispersion may be carried out on a hot plate.

The drying is generally achieved at a temperature from 100° C. to 140° C., for example 120° C., for a period from 0.5 to 3 hours, for example a period of one hour.

At the end of the drying, a homogeneous mixture of the powders of precursors which no longer contains any solvent is obtained.

According to the invention, sintering of the mixture of powders of precursors, for example of the mixture of a barium carbonate $BaCO_3$ powder, of a silica $SiO_2$ powder, and of an aluminium hydroxide $Al(OH)_3$ powder is then carried out in a single step by a hot sintering technique with a pulsed electric field SPS.

The hot sintering technology with a pulsed electric field ("Spark Plasma Sintering" or "SPS") is also known under the name of "Field Activated Sintering Technique" or FAST or further with the name of "flash sintering". This method notably allows fast densification of powders.

The "SPS" is a sintering technique which consists of simultaneously applying on the powdery sample to be densified an uniaxial pressure and «pulses» of current with a strong intensity which causes a rise in temperature of the sample. The current is applied as trains of current pulses, for example with a period of 3.2 ms, for which the intensity may attain several thousands amperes, for example up to 8,000 A, or even 50,000 A.

The current is applied to the sample via an assembly of plates and pistons made of graphite, the mixture of powders is inserted inside a matrix, sleeve, pelletizer, or mould made of graphite.

The assembly consisting of the sleeve, pelletizer or mould, the pistons and the plates, is the only one in the vacuum chamber, which rises in temperature.

Figure 1:
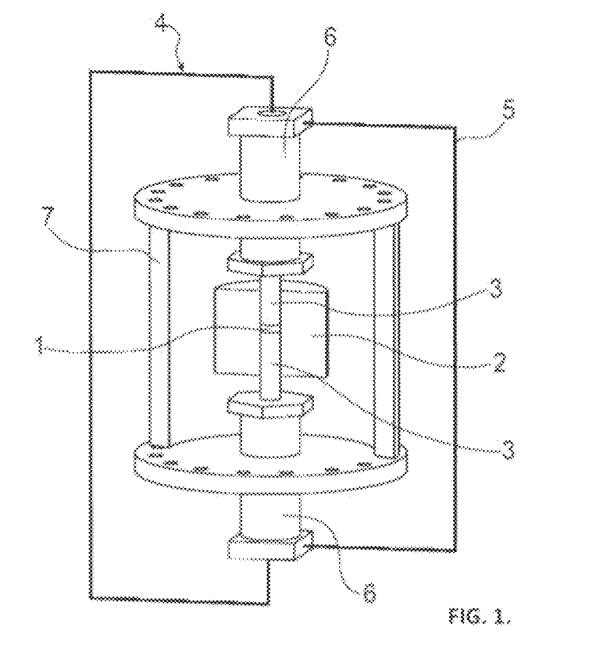
FIG. 1 is a schematic vertical sectional view of an example of an SPS apparatus for applying the method according to the invention.

More exactly, in FIG. 1 is illustrated the operating principle of an SPS apparatus suitable for applying the method according to the invention, and its main organs. The mixture of the powders (1), is placed in a mould, a sleeve, a matrix, pelletizer made of graphite (2), between two pistons also made of graphite (3). A pressure (4) is applied to these pistons (3), and a DC current (5) is applied to electrodes (6). The mixture of the powders (1), the pistons (3), and the graphite sleeve (2) and a portion of the electrodes (6) are placed inside a vacuum chamber (7).

The temperature is tracked via an optical pyrometer which also controls the electric power injected into the assembly.

The main benefit of "SPS" technology is to raise the temperature with a minimum of heat energy and of reacting and densifying the mixture of powders in relatively short times of the order of a few minutes, for example for 5 to 10 minutes.

The sintering rapidity gives the possibility of limiting the diffusion and granular growth phenomena which has the effect of retaining submicron grain sizes. It is possible to attain a density close to 100%. One generally starts by placing the mixture of powders inside the mould, of pelletizer, the sleeve, the matrix made of graphite of the "SPS" device machine, described above.

Generally, a sheet of flexible graphite such as the product marketed under the commercial name of PAPYEX® by Carbone Lorraine is placed between the mixture of powders and the internal walls of the mould and between the mixture of powders and the pistons. This sheet has the purpose of preventing the powders from reacting with the mould and the pistons and of preserving them.

The PAPYEX® may be coated on one of its faces, i.e. the face in contact with the mixture of powders, with a boron nitride BN layer.

BN plays the role of a diffusion barrier between the precursors and the graphite.

The mould made of graphite may also be covered with a graphite felt for limiting radiation.

The pelletizer, matrix, sleeve, mould made of graphite and the pistons are then placed in the SPS machine such as the machine described in FIG. 1.

The vacuum chamber is closed and then evacuation is initiated. When the desired vacuum, i.e. when the pressure is generally less than 10 Pa, the sintering operation by SPS strictly speaking may then begin.

A sufficient pressure is applied to said mixture of powders and simultaneously, a sufficiently pulsed electric current is applied to said mixture in order to raise the temperature of the part up to a sufficient temperature for causing a reaction and sintering of the mixture of the powders of precursors.

In other words, when everything is in contact (pelletizer, pistons, mixture), an electric current may be generated in order to generate the rise in temperature. Generally, the maximum amperage which a matrix may support is notably related to its diameter. Thus, for a sample diameter of 8 mm, it is possible to apply 2,000 A without risking deterioration of the matrix. For larger diameters such as 20 mm, it is possible to apply 4,000 A or more.

The applied pulsed electric current is generally from 1 A to 50,000 A in order to generate a rise in temperature up to a temperature (plateau temperature) comprised between 1,000° C. and 2,500° C. The pressure which is applied at the same time corresponds to an applied force from 0.01 MPa to 500 MPa.

Preferably, the applied pressure is according to the invention generally from 1 to 200 MPa and the applied intensity is preferably from 500 to 8,000 A. Preferably, the pressure is from 10 to 150 MPa, still preferably from 20 to 100 MPa, for example 40 MPa.

Preferably, the intensity is from 200 to 6,000 A, still preferably from 300 to 1,000 A.

The pressure and intensity values are selected from among the inside of the ranges above so that the temperature of the mixture of powders of precursors rises to a temperature (plateau temperature) allowing reaction, sintering of the mixture of powders of precursors, and its densification, preferably its total densification. Such a temperature is generally from 700° C. to 2,000° C., preferably from 1,000° C. to 1,500° C., still preferably from 1,100° C. to 1,300° C., for example 1,200° C.

The period during which said temperature is maintained (further called plateau temperature) for example of 1,200° C., a duration which may also be called a plateau duration or time is a short period generally from 0 to 10 minutes, preferably from 0 to 7 minutes, for example 5 minutes.

When the plateau time is equal to 0, this means that a rise in temperature up to the maximum temperature is carried out and that the temperature is lowered to room temperature without observing any plateau.

It will be noted that this plateau period is in every case very short, as compared with other sintering methods.

Such a very short sintering duration is particularly advantageous in the case when BAS is hexagonal BAS, since it gives the possibility of "setting" the hexagonal, metastable high temperature phase of the BAS.

Also, the cycle time without cooling, and the overall, total duration of the complete cycle with cooling, are reduced.

This cycle time is for example from 10 to 30 minutes, notably from 20 to 22 minutes only, and the duration of the complete cycle is of about one hour, which is another advantage of the method according to the invention.

It is generally important to control the descent in temperature and in pressure in order to avoid the cracking of the material.

The cooling of the material is generally carried out in a not too sudden way as may understand the man skilled in the art in this technical field. Thus, a cooling rate from 1° C. to 600° C. per minute, for example from 10° C. to 100° C./min from the temperature plateau will generally be observed.

Preferably, the cooling is carried out with successive ramps having different slopes, thus the cooling may be carried out for example as follows: 45° C./min from the plateau temperature to 600° C.; and then cooling according to the inertia of the machine from 600° C. to room temperature.

It is obvious for the man skilled in the art, that the temperature-pressure cycle is to be optimized for each type of mixture of powders of precursors, applied. On the other hand, regardless of the rises, descents or durations of the plateaus in temperature and in pressure, the simultaneity of the temperature and of the pressure is indispensable to proper sintering of the mixture of powders of precursors.

Advantageously, the temperature parameters and therefore the intensity parameters, and the pressure parameters (or applied force parameters, the pressure depending on the supporting surface according to the well-known relationship P=F/S) are not, from room temperature and a pressure of 0 MPa, applied in a sudden, instantaneous way, but are raised gradually from room temperature and from a pressure of 0 MPa.

For temperature (governed by the intensity), preferably a gradual rise will thus be achieved with a ramp, or several ramps optionally having different slopes, these ramps being optionally separated by intermediate plateaus, in order to reach the maximum temperature mentioned above, also called plateau or sintering temperature.

Said temperature ramps preferentially have a slope from 50° C. to 200° C./min, for example of 80° C./min, or 100° C./min.

Globally, in order to reach the maximum temperature, for example 1,200° C., the rise in temperature of the ramps is preferably adjusted so as to be as close as possible to a ramp at 80° C./minutes.

According to the invention, during the sintering, a first plateau may be observed at a first temperature for removing the water contained in the aluminium hydroxide $Al(OH)_3$, a second optional plateau at a second temperature for forming intermediate compounds, and a third plateau at a third temperature for forming the aluminosilicate, such as BAS.

The first plateau may be achieved at a temperature from 900° C. to 1,000° C., for example 900° C., for a period from 1 to 5 minutes, for example of 1 minute;

The second plateau may be achieved at a temperature from 1,100° C. to 1,200° C., for example 1,100° C., for a period from 0 to 20 minutes, preferably from 1 to 20 minutes, for example 10 minutes;

The third plateau may be achieved at a temperature from 1,200° C. to 1,700° C., for example 1,200° C., for a period from 1 to 20 minutes, for example 10 minutes.

For the pressure, in the same way it is advantageously possible to achieve a gradual rise with a ramp, or several ramps optionally having different slopes, these ramps being optionally separated by intermediate plateaus, in order to arrive up to the maximum pressure indicated above, also called a plateau or sintering pressure.

Said pressure ramp(s) are generally a slope of 1 MPa/min to 20 MPa/min, preferably from 5 to 10 MPa/min.

The rise in temperature and the rise in pressure whether they are progressive or not, are preferentially accomplished in a simultaneous, concomitant way, in a same period, time.

If several pressure ramps and several temperature ramps are achieved, the corresponding pressure and temperature ramps preferably have the same duration.

By applying the temperature parameters (and therefore intensity parameters) and/or pressure parameters (and therefore applied force parameters) gradually and not in a sudden, instantaneous, sharp way, it is thereby avoided to subject the material to too strong stresses and no breakage of the material is to be deplored.

As an example, a rise in temperature, from room temperature (generally 20° C. to 25° C.), up to 1,200° C., may be carried out in the following way (see FIG. 2):
  room temperature to 570° C.: about 1 minute;
  570° C. to 600° C.: about 4 minutes;
  600° C. to 900° C.: about 3 minutes;
  plateau at 900° C.: about 1 minute;
  900° C. to 1,100° C.: about 3 minutes;
  Plateau at 1,100° C.: about 10 minutes;
  1,100° C. to 1,200° C.: about 1 minute;
  Plateau at 1,200° C.: about 10 minutes;
  Cooling from 1,200° C. to room temperature: a duration conditioned by the thermal inertia of the machine, for example from 10 minutes to 30 minutes, notably 20 minutes.

Figure 2:
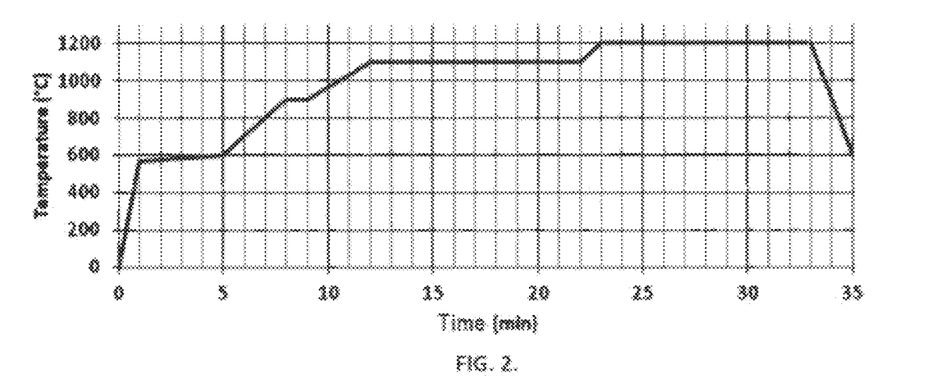
FIG. 2 is a graph which shows a thermal cycle used during the SPS sintering step of the method according to the invention.

During the same time, the pressure develops in the following way:
  40 MPa from time 0 (moment when the heating begins from room temperature, i.e. beginning of the first temperature ramp) to the final time (end of the heating, end of the plateau at 1,200° C.).

The current is applied in the form of series, trains of pulses; each series, train, consists of a determined and adjustable number of "pulses". The series (trains) are separated from each other by a period during which the applied current is zero.

In the method according to the invention, pulses from 1 to 5 ms for example with a period of 3.3 ms are generally used, generally assembled by a train from 1 to 15, for example 12 pulses, each train being generally separated by 1 to 15 periods, for example 2 periods, of the period (such as 3.3 ms) above, without any current.

It is possible to change these values but the current should always keep the same geometry, i.e.: more or less numerous trains of pulses separated by variable periods without any current.

The applied voltage is of a few volts, generally from 1 to 8 volts, preferably from 2 to 7 volts, typically 3 volts for 500 A.

At the end of the cooling, generally down to room temperature, for example from 20° C. to 25° C., the material prepared by the method according to the invention is recovered in the "SPS" apparatus.

The material according to the invention is a material based on an aluminosilicate, said aluminosilicate consisting (100% by mass) of aluminosilicate with a hexagonal structure.

As already indicated above, by a material based on an aluminosilicate, is generally meant a material comprising 80% by mass or more, still preferably 100% by mass of aluminosilicate, such as barium aluminosilicate.

The remainder of the powder of the material according to the invention may comprise one or several impurities for example selected from among alumina, silica and barium silicates such as $Ba_5Si_8O_{21}$ and $Ba_3Si_5O_{13}$.

Advantageously, the prepared material based on an aluminosilicate such as barium aluminosilicate BAS is dense, homogeneous and not cracked.

The method according to the invention may further comprise a step during which the material based on an aluminosilicate, consisting of an aluminosilicate of hexagonal structure, is heat treated in order to obtain an aluminosilicate, consisting of aluminosilicate with a monoclinic structure.

In other words, the phase of the aluminosilicate, such as the BAS of the material obtained according to the invention is hexagonal and it is easy for the man skilled in the art, if this is desired, to carry out a conventional heat treatment for transforming the hexagonal phase into an orthorhombic phase or into a monoclinic phase.

Thus, a heat treatment for example with a period of 1 hour to 10 hours, at a low temperature, for example around 300° C., gives the possibility of transforming the hexagonal BAS into orthorhombic BAS.

Or else a prolonged heat treatment for example with a period of 150 hours, at a higher temperature, for example towards 1,200° C., gives the possibility of transforming hexagonal BAS into monoclinic BAS.

The material prepared by the method according to the invention may appear in different forms, for example in the form of a monolith or a powder, or else it may be used for preparing a composite material by constituting the matrix of this composite material, as in documents [4] and [4A].

At the output of the SPS, the obtained material is a sintered block.

And the invention therefore also relates to a method for preparing a composite material, consisting of a matrix made of at least one aluminosilicate, reinforced by reinforcements made of at least one metal or metalloid oxide, for which the dilatation coefficient is close to that of the at least one aluminosilicate.

In this method, a material based on an aluminosilicate is prepared (step a) by the method according to the invention as described above, and then if necessary a powder of said material based on an aluminosilicate is prepared, generally by milling.

Next, the steps b) to e) of the method for preparing a composite material according to the invention, are the steps a) to d) of the method as described in documents [4A] and [4B] to the descriptions of which reference is expressly made and to which reference may be made.

In other words, in the method described in documents [4A] and [4B] a powder of the material based on an aluminosilicate prepared by the method according to the invention as discussed above is used.

Let us specify that the powder of aluminosilicate, for example of barium aluminosilicate BAS may consist in particles of any shape for example of a spherical or spheroidal shape.

The average size—defined by their largest dimension—of the particles of the barium aluminosilicate powder is generally from 10 nm to 100 microns, preferably from 1 micron to 10 microns.

As this is specified further on, when the aluminate powder, for example the BAS powder is of a hexagonal structure, then the reinforcements are preferably made of alumina.

Or else, if the aluminosilicate powder is of a monoclinic structure then the reinforcements are preferably made of silica and/or made of mullite.

The composite material prepared by the method according to the invention, because of its excellent mechanical properties and resistance to high temperatures properties finds its application in fields as diverse as aeronautics, aerospace for example for manufacturing radomes, the chemical industry and generally in all the fields where excellent mechanical properties at high temperatures are required.

The invention will now be described with reference to the following examples, given as an illustration and not as a limitation.

EXAMPLES

In the following examples, five samples of Barium Aluminosilicate BAS are prepared.

In example 1, a BAS sample 1 is prepared by a method according to the prior art wherein sintering in two steps is carried out in a tubular oven from powders of $BaCO_3$, $SiO_2$, and $Al_2O_3$.

In example 2, a BAS sample, sample 2 is prepared by a method non-compliant with the invention in which sintering is carried out in a single step, by SPS according to the cycle shown in FIG. 2, of a mixture of $BaCO_3$, $SiO_2$, and $Al_2O_3$ powders.

In example 3, a BAS a sample, sample 3 is prepared by a method non-compliant with the invention wherein sintering is carried out in two steps in a tubular oven from $BaCO_3$, $SiO_2$, and $Al(OH)_3$ powders dispersed in ethanol.

In example 4, a BAS sample, sample 4 is prepared by a method according to the invention wherein sintering is carried out in a single step, by SPS according to the cycle shown in FIG. 2, of a mixture of $BaCO_3$, $SiO_2$, and $Al(OH)_3$ powders dispersed in ethanol and then dried.

In example 5, a BAS sample, sample 5 is prepared by a method according to the invention wherein sintering is carried out in a single step, by SPS according to the cycle shown in FIG. 2, of a mixture of $BaCO_3$, $SiO_2$, and $Al(OH)_3$ powders dispersed in a basic medium, i.e. water with a pH of 11, and then dried.

In these five examples, the benefit is shown on the one hand of replacing alumina by aluminium hydroxide in the initial compositions in order to obtain a more reactive mixture and on the other hand the requirement of using a heat treatment by SPS rather than a conventional treatment in a tubular oven.

1. Raw materials used.

The powders used for the synthesis of the BAS are the following:

a. Alumina ($Al_2O_3$).

The alumina powder of reference 265497 stems from SIGMA-ALDRICH®. The $d_{50}$ of the particles is of 10 μm and its purity is 99.7%.

b. Silica ($SiO_2$).

The silica powder stems from SIGMA-ALDRICH, its reference is S5631. This is $SiO_2$ in the form of quartz with a purity close to 99%, and a grain size comprised between 0.5 and 10 μm, including 80% between 1 and 5 μm.

c. Barium carbonate ($BaCO_3$).

The barium carbonate powder stems from SIGMA-ALDRICH, its reference is 237108. Its average grain size is 5 μm, and its purity is greater than 99%.

d. Aluminium hydroxide of formula $Al(OH)_3$.

The aluminium hydroxide powder stems from Alfa Aesar®. Its purity is greater than 76.5%. It has an average grain size of 10 μm after dispersion with a sonotrode.

2. Preparation of the mixtures:

The preparation of the mixtures begins by weighing the different powders in a same container.

A solvent is added in order to obtain a suspension. The solvent is ethanol or water with addition of ammonia.

The suspension is homogenized by means of a sonicator Vibrocell® 75401 for 4 min at a power of 30% with 2 seconds of activity and 2 seconds of stopping.

The suspension is then dried on a heat plate hob at 120° C. for 1 h.

3. Heat treatments:

Two heat treatments were applied during the preparation of the five samples.

The first treatment is a treatment which may be described as a «conventional» treatment which is carried out in a tubular oven.

The second treatment is a treatment according to the invention by SPS.

3.1. Treatments in a tubular oven.

For the treatments in a tubular oven, the powder is pelletized by means of a matrix with a diameter of 10 mm. About 1.5 g of powder is used per tablet, pellet, disc. The applied pressure is arbitrarily set to 200 bars.

The heat treatment in a tubular oven (Carbolite® 1500) in air is divided into two steps. The first step consists of mixing $BaCO_3$ and $SiO_2$ for reacting them around 1,150° C. and forming a barium silicate. The barium silicate is then mixed with the alumina in order to form the BAS at 1,200° C.

3.2 Treatment by SPS.

The SPS treatment may be carried out with a device such as the one illustrated in FIG. 1, already described above.

For each test, two discs (with a radius of 10 mm) and a square (with a side of 31 mm) are cutout in a Papyex® sheet (graphite sheet) with a thickness of 0.5 mm.

The Papyex® sheets are used for protecting the mold and for preventing adhesion of the material. The Papyex® is covered with a BN layer on the areas which will be in contact with the powder.

The BN layer is deposited by means of an aerosol spray. The BN layer limits the diffusion of carbon into the material.

The square sheet of Papyex® is rolled and then inserted into the matrix. A piston is inserted into the matrix up to half of its height. A Papyex® disc is deposited against the piston. The surface covered with BN is opposite to the piston. The powder is poured and manually packed. The second Papyex® disc is inserted so as to put the powder in contact with the face covered with BN. The second piston is introduced for closing the system. A slight pressure, generally less than 3 kN, is applied on the pistons in order to avoid having too significant displacements during the heat cycle. The position of the pistons should be adjusted so that they emerge in an equivalent way from each side of the matrix.

The assembly is placed in an SPS machine, such as the one illustrated in FIG. 1. The reference cycle for the tests is the one shown in FIG. 2.

The rise in temperature is adjusted so as to be as close as possible to a ramp at 80° C./min.

Three plateaus are observed.

The first plateau at 900° C. allows the removal of the water contained in $Al(OH)_3$ when the mixture of powders contains some. The second plateau at 1,100° C. for 10 minutes gives the possibility to the intermediate compounds of forming. The third and last plateau at 1,200° C. for 10 minutes completes the reaction for forming the BAS.

The following table 2 indicates the composition of the powders used for preparing the BAS samples, as well as the heat treatments used for preparing the BAS samples.

TABLE 2

Composition of the powders used for preparing the BAS samples, and heat treatments used for preparing each sample.

| | Sample 1 | Sample 2 | Sample 3 | Sample 4 | Sample 5 |
|---|---|---|---|---|---|
| $BaCO_3$ | 0.694 g | 0.694 g | 0.487 g | 0.487 g | 0.487 g |
| $SiO_2$ | 0.423 g | 0.423 g | 0.297 g | 0.297 g | 0.297 g |
| $Al_2O_3$ | 0.359 g | 0.359 g | 0 g | 0 g | 0 g |
| $Al(OH)_3$ | 0 g | 0 g | 0.677 g | 0.677 g | 0.677 g |
| Solvent | Ethanol 25 ml | Ethanol 25 ml | Ethanol 25 ml | Ethanol 25 ml | Water + $NH_4$ pH = 11 |
| Sintering | Tubular oven | SPS | Tubular oven | SPS | SPS |

4. Characterization.

The prepared samples are analyzed by XRD (powder X-ray Diffraction) by means of a diffractometer Bruker® D8 Advance, and the use of the Rietveld method allows the making of a quantitative analysis of the phases.

All the amounts are displayed in mass percent.

The quantitative analysis is produced by means of the Fullprof® software.

The quality of the measurement is represented by the confidence factor $R_{wp}$. $R_{wp}$ has to be minimized in order to obtain a reliable value. The errors on the measurements shown here are of the order of 1%.

Observations with the scanning electron microscope (SEMe FEI 400 FEG) of the sample sections are used for controlling the morphology and the elements present in each of the phases.

Hydrostatic weighing operations give the possibility of measuring the porosity level in the produced samples. The ImageJ® software gives the possibility of carrying out an image analysis and therefore to correlate the results obtained by XRD and by hydrostatic weighing.

Example 1

In this example, a BAS sample, sample 1 is prepared, by a method according to the prior art wherein the heat treatment is a dual treatment in a tubular oven, i.e. sintering in two steps in a tubular oven, and the BAS is prepared from $BaCO_3$, $SiO_2$, and $Al_2O_3$ powders.

In a first step, a mixture of $BaCO_3$ powder and of $SiO_2$ powder prepared by dispersion in ethanol, and then dried from 120° C. to 150° C., is heat treated in a tubular oven in air up to a temperature of 1,150° C. for 4 h.

The silicates obtained at the end of the first step are then mixed with the alumina powder and the obtained mixture is heat treated in a tubular oven in air at a temperature of 1,200° C. for 6 h, whereby the sample 1 is obtained.

Figure 3A:
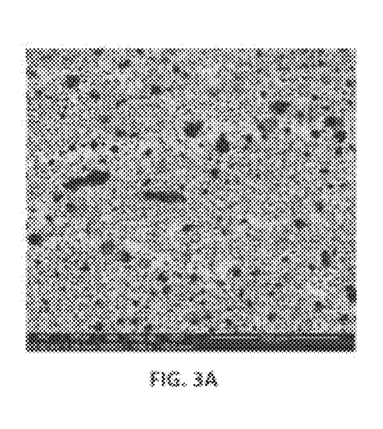
FIGS. 3A and 3B are micrographs, made such a scanning electron microscope of a section of a BAS disc, pellet, tablet (sample 1, Example 1) obtained by a method according to the prior art in which sintering in two steps is carried out in a tubular oven from $BaCO_3$, $SiO_2$, and $Al_2O_3$ powders.
Figure 3B:
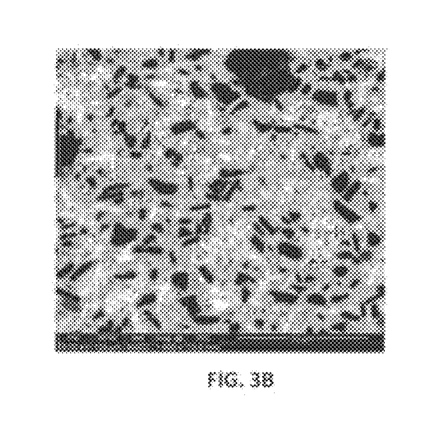

FIGS. 3A and 3B are micrographs, made by a scanning electron microscope of a section of the BAS tablet, sample 1, obtained in this example.

Figure 4:
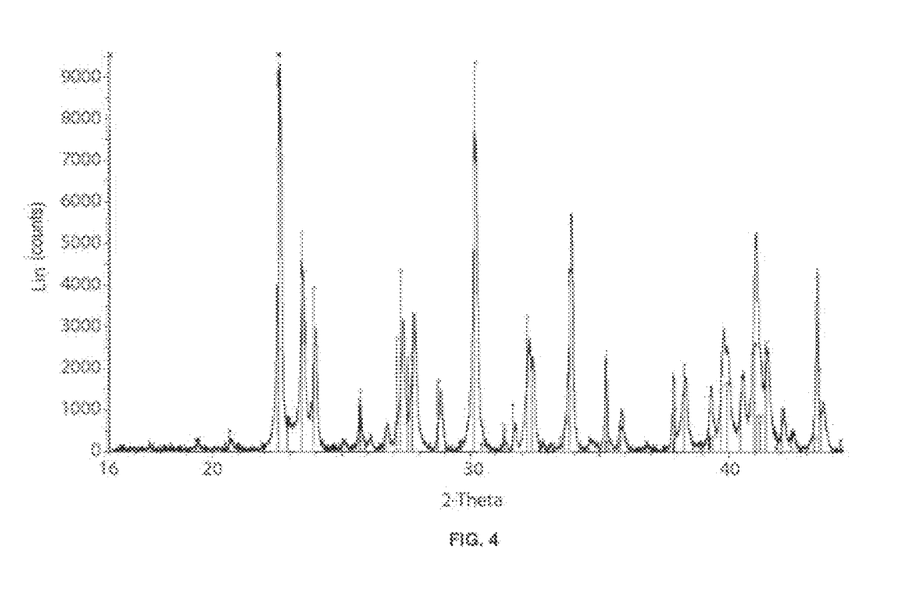
FIG. 4 is a diffractogram obtained during the analysis by XRD (powder X-ray Diffraction) of a BAS disc (sample 1, Example 1) obtained by a method according to the prior art in which sintering in two steps is carried in a tubular oven from $BaCO_3$, $SiO_2$, and $Al_2O_3$ powders.

FIG. 4 is a diffractogram obtained during the analysis by XRD of one of the BAS tablets, pellets, sample 1, obtained in this example.

The table 3 below gives the results of a quantitative analysis made on sample 1, prepared in this example, the amounts indicated in this Table are in mass percentages.

TABLE 3

Quantitative analysis of sample 1.

| Hexacelsian | Alumina | $BaSi_2O_5$ | $Ba_5Si_8O_{21}$ | Rwp |
|---|---|---|---|---|
| 49 | 23 | 6 | 22 | 17.9 |

The material of sample 1 is very heterogeneous. The darkest grains in FIG. 3 are alumina grains. The gray matrix is $BaAl_2Si_2O_8$ in its hexagonal form. The bright residues are barium silicates. Only a small half of the material is hexacelsian, i.e. 49% by mass.

Example 2

In this example, a BAS sample, sample 2 is prepared by a method non-compliant with the invention in which sintering is carried out in a single step, by SPS according to the cycle shown in FIG. 2, of a mixture of $BaCO_3$, $SiO_2$, and $Al_2O_3$ powders prepared by dispersion in ethanol, and then dried from 120° C. to 150° C., which may be described as a mixture of conventional powders.

Figure 5A:
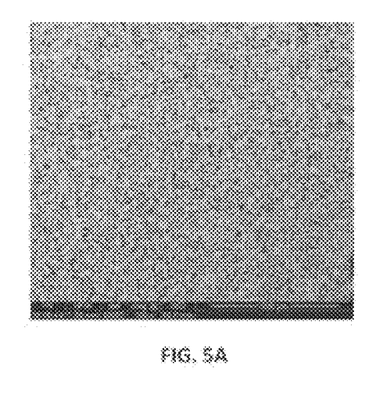
FIGS. 5A and 5B are micrographs, made with a scanning electron microscope of a section of BAS disc (sample 2, Example 2) obtained by a method according to the prior art wherein sintering in a single step is carried out, by SPS according to the cycle shown in FIG. 2, of a mixture of $BaCO_3$, $SiO_2$, and $Al_2O_3$ powders.
Figure 5B:
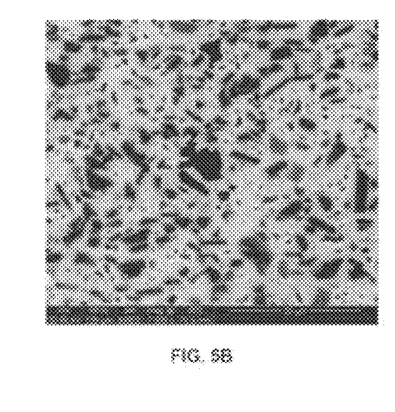

FIGS. 5A and 5B are micrographs, produced by a scanning electron microscope of a section of the BAS tablet, pellet, disc, sample 2, obtained in this example.

Figure 6:
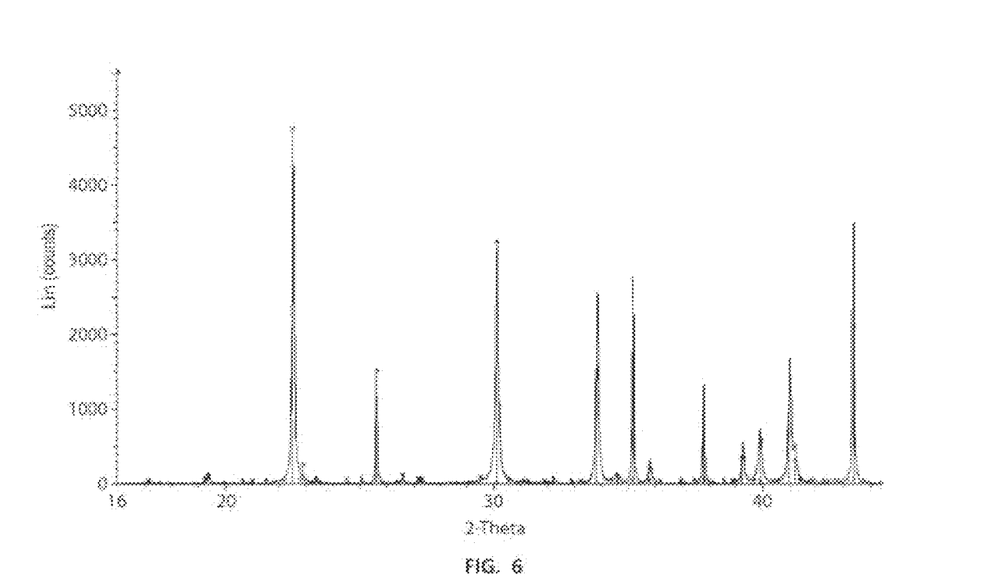
FIG. 6 is a diffractogram obtained during the analysis by XRD (X-ray Diffraction) of a BAS disc (sample 2, Example 2) obtained by a method according to the prior art wherein sintering in a single step is carried out, by SPS according to the cycle shown in FIG. 2, of a mixture of $BaCO_3$, $SiO_2$, and $Al_2O_3$ powders.

FIG. 6 is a diffractogram obtained during the XRD analysis of one of the BAS tablets, sample 2, obtained in this example.

Table 4 below gives the results of a quantitative analysis achieved on sample 2, prepared in this example, the amounts indicated in this Table are in mass percentages.

TABLE 4

Quantitative analysis of sample 2.

| Sample | Hexacelsian | Alumina | $BaSi_2O_5$ | $Ba_5Si_8O_{21}$ | $Ba_2Si_3O_8$ | Rwp |
|---|---|---|---|---|---|---|
| SPS $Al_2O_3$ | 10 | 40 | 5 | 23 | 22 | 19.8 |

The material of sample 2 begins to melt as soon as the beginning of the plateau at 1,200° C. It is not possible to complete the heat cycle on this type of sample. The melted portion essentially consists of barium silicates while the core of the tablet (FIGS. 5A and 5B) is richer in aluminous compounds.

Example 3

In this example, a BAS sample, sample 3, is prepared by a method non-compliant with the invention wherein sintering is carried out in two steps in a tubular oven from $BaCO_3$, $SiO_2$, and $Al(OH)_3$ powders dispersed in ethanol.

In a first step, a mixture of $BaCO_3$ powder and of $SiO_2$ powder prepared by dispersion in ethanol, and then dried from 120° C. to 150° C., is heat treated in a tubular oven in air at a temperature of 1,150° C. for 4 h.

The silicates obtained at the end of the first step are then mixed with the aluminium hydroxide powder and then dried in the presence of ethanol, and the obtained dry mixture of powders is heat treated in a tubular oven in air at a temperature of 1,200° C. for 6 h, whereby the sample 3 is obtained.

Figure 7A:
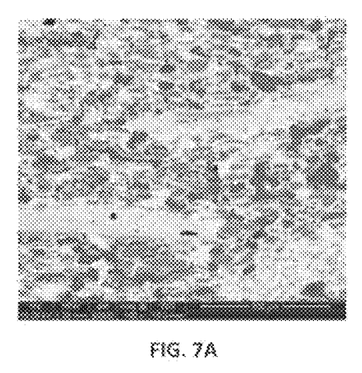
FIGS. 7A and 7B are micrographs, made by a scanning electron microscope of a section of a BAS disc (sample 3, Example 3) obtained by a method not compliant with the invention wherein sintering in two steps is carried out in a tubular oven from $BaCO_3$, $SiO_2$, and $Al(OH)_3$ powders dispersed in ethanol.
Figure 7B:
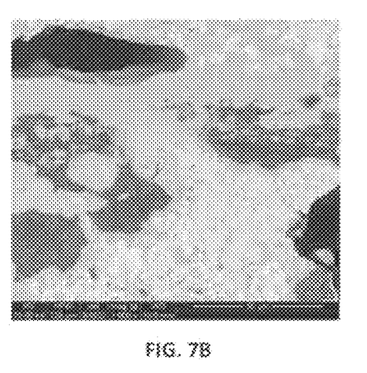

FIGS. 7A and 7B are micrographs, made by a scanning electron microscope of a section of the BAS tablet, sample 3, obtained in this example.

Figure 8:
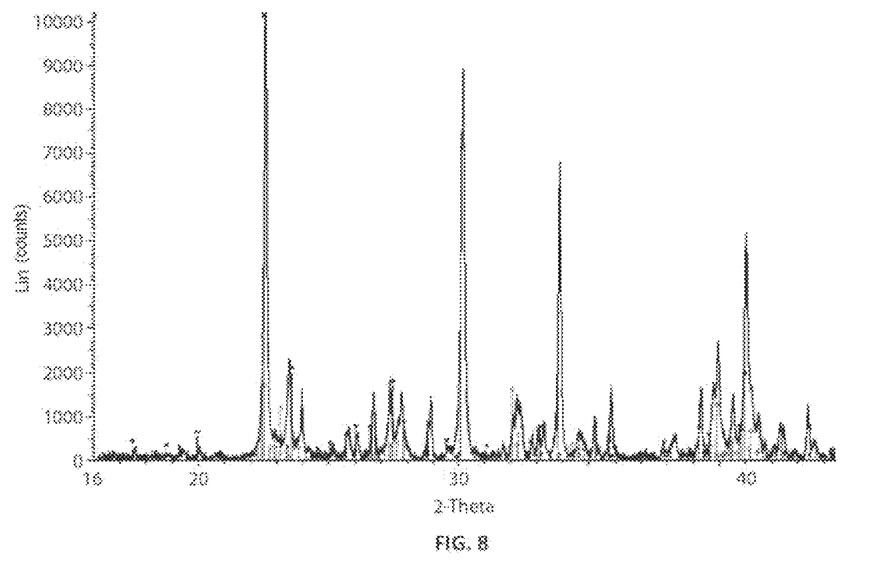
FIG. 8 is a diffractogram obtained during the analysis by XRD (power X-ray Diffraction) of a BAS disc (sample 3, Example 3) obtained by a method according to the prior art in which sintering in two steps is carried out in a tubular oven from $BaCO_3$, $SiO_2$, and $Al(OH)_3$ powders dispersed in ethanol.

FIG. 8 is a diffractogram obtained during the analysis by XRD of one of the BAS tablets, sample 3, obtained in this example.

Table 5 below gives the results of a quantitative analysis carried out on the sample 3, prepared in this example, the indicated amounts in this Table are in mass percentages.

TABLE 5

Quantitative analysis of sample 3.

| Hexacelsian | Alumina | $BaSi_2O_5$ | $Ba_5Si_8O_{21}$ | $Ba_{0.79}Al_{10.9}O_{17.14}$ | Rwp |
|---|---|---|---|---|---|
| 50 | 13 | 5 | 22 | 10 | 33.7 |

Half of the material of sample 3 consists of BAS in the hexagonal form. The other half consists of various residues ($Al_2O_3$, $BaSi_2O_5$, $Ba_5Si_8O_{21}$ and $Ba_{0.79}Al_{10.9}O_{17.14}$). The alumina residues are in the form of packets. These are the darkest material clusters of FIGS. 7A and 7B. The bright portions of FIGS. 7A and 7B consist of barium silicates. The phase with an intermediate colour of FIGS. 7A and 7B is $BaAl_2Si_2O_8$.

Example 4

In this example, a BAS sample, sample 4 is prepared by a method according to the invention wherein sintering is carried out in a single step, by SPS according to the cycle shown in FIG. 2, of a mixture of $BaCO_3$, $SiO_2$, and $Al(OH)_3$ powders dispersed in ethanol and then dried.

Figure 9A:
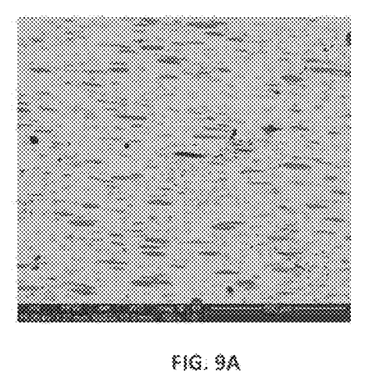
FIGS. 9A and 9B are micrographs, made by a scanning electron microscope of a section of a BAS disc (sample 4, Example 4) obtained by a method according to the invention in which sintering in a single step is carried out, by SPS according to the cycle shown in FIG. 2, of a mixture of $BaCO_3$, $SiO_2$, and $Al(OH)_3$ powders dispersed in ethanol.
Figure 9B:
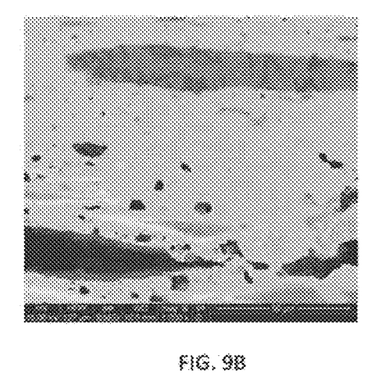

FIGS. 9A and 9B are micrographs, made by a scanning electron microscope of a section of the BAS tablet, sample 4, obtained in this example.

Figure 11:
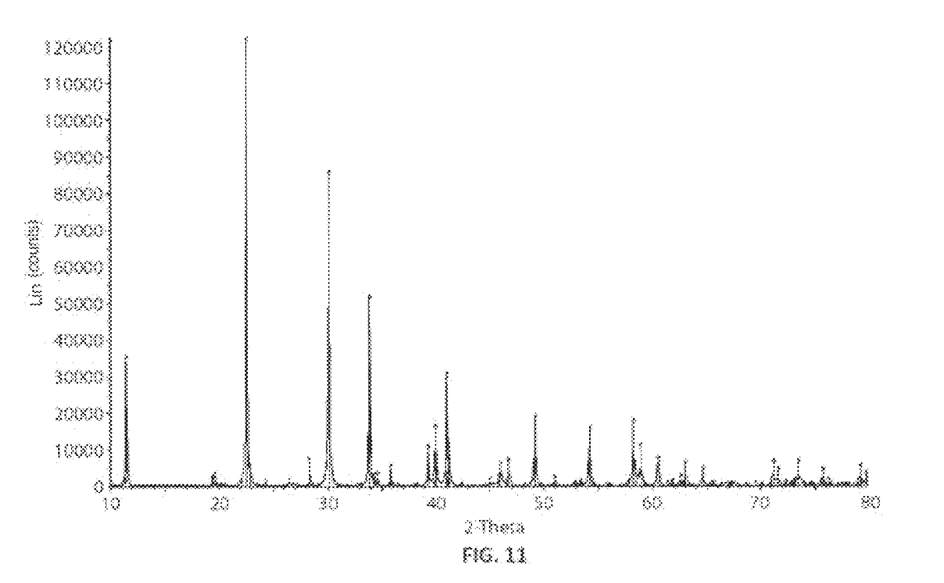
FIG. 11 is a diffractogram obtained during the analysis by XRD (powder X-ray Diffraction) of a BAS disc (sample 4, Example 4) obtained by a method according to the invention in which sintering in a single step is carried out, by SPS according to the cycle shown in FIG. 2, of a mixture of $BaCO_3$, $SiO_2$, and $Al(OH)_3$ powders dispersed in ethanol.

FIG. 11 is a diffractogram obtained during the XRD analysis of one of the BAS tablets, sample 4, obtained in this example.

Table 6 below gives the results of a quantitative analysis, only taking into account the crystallized phases, conducted on the sample 4, prepared in this example, and on sample 5, prepared in example 5, the amounts indicated in this Table are in mass percentages.

TABLE 6

Quantitative analysis of sample 4 and of sample 5, only taking into account crystallized phases.

| Sample | Hexacelsian | Alumina | $Ba_{0.79}Al_{10.9}O_{17.14}$ | Rwp |
|---|---|---|---|---|
| 4 | 98 | | 2 | 12.8 |
| 5 | 90 | 7 | 3 | 12.9 |

Example 5

Figure 10A:
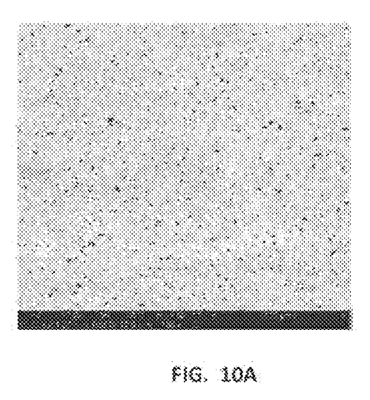
FIGS. 10A and 10B are micrographs, made by a scanning electron microscope of a section of a BAS disc (sample 5, Example 5) obtained by a method according to the invention wherein sintering in a single step is carried out, by SPS according to the cycle shown in FIG. 2, of a mixture of $BaCO_3$, $SiO_2$, and $Al(OH)_3$ powders dispersed in a basic medium, i.e. water at a pH of 11.
Figure 10B:
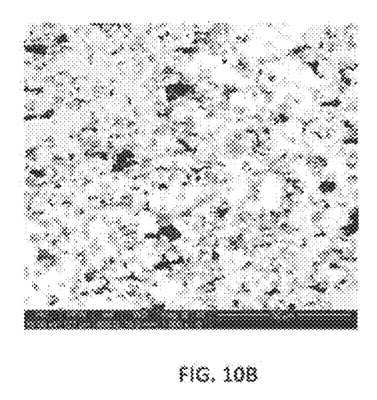

In this example, a BAS sample, sample 5 is prepared by a method according to the invention wherein sintering is carried out in a single step, by SPS according to the cycle shown in FIG. 2, of a mixture of $BaCO_3$, $SiO_2$, and $Al(OH)_3$ powders dispersed in a basic medium, i.e. water with a pH of 11, and then dried. FIGS. 10A and 10B are micrographs, made by a scanning electron microscope of a section of the BAS tablet, disc, pellet, sample 5, obtained in this example.

Figure 12:
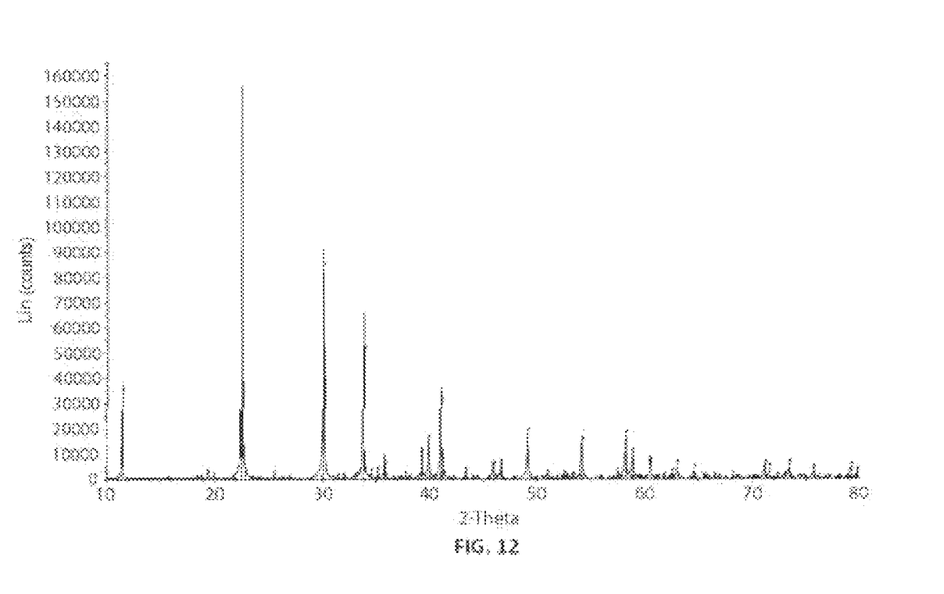
FIG. 12 is a diffractogram obtained during the analysis by XRD (powder X-ray Diffraction) of a BAS disc (sample 5, Example 5) obtained by a method according to the invention wherein sintering in a single step is carried out, by SPS according to the cycle shown in FIG. 2, of a mixture of $BaCO_3$, $SiO_2$, and $Al(OH)_3$ powders dispersed in a basic medium, i.e. water at a pH of 11.

FIG. 12 is a diffractogram obtained during the analysis by XRD of one of the BAS tablets, sample 5, obtained in this example.

Table 7 below gives the results of a quantitative analysis, corrected by taking into account amorphous phases, conducted on the sample 5, prepared in this example, and on sample 4, prepared in example 4, the amounts indicated in this Table are in mass percentages.

TABLE 7

Quantitative analysis of sample 5 and of sample 4; taking into account the amorphous phases.

| Sample | Hexacelsian | Alumina | $Ba_{0.79}Al_{10.9}O_{17.14}$ |
|--------|-------------|---------|-------------------------------|
| 4 | 80 | 18 | 2 |
| 5 | 83 | 12 | 3 |

A point out ("pointé") EBSD in the dark clusters of the sample 4 shows that they consist of alumina. However, in XRD, this alumina is not detected (FIG. 11). It is therefore possible to conclude that this alumina is amorphous. The quantitative analyses shown in table 6 only show the crystallized phases amounts.

The image analysis here is only used for determining the amount of dark grains of alumina and therefore the amorphous phase amount. The image analysis gave the possibility of determining that the alumina amount in the sample 4 and the sample 5 are 18% and 14% respectively in volume. The values converted into mass are written in the table 7, i.e. 18% and 12% respectively.

It is possible to ascertain that the elaboration of samples according to the invention leads to a chemical composition in majority with more than 80% of BAS of hexagonal structure. The remaining 20% in majority consists of amorphous alumina. This elaboration of the BAS is accomplished in a single step by SPS from aluminium hydroxide. The use of a basic medium during the mixture of the powders gives the possibility of obtaining a more homogeneous microstructure of the sample.

The examples provided above clearly show that it is possible to prepare BAS with a method comprising a single heat treatment step. For this, it was shown that it is necessary to use aluminium hydroxide and sintering by SPS.

Indeed, by conventionally using a mixture of powders containing alumina and conventional sintering in a tubular oven, a very heterogeneous material is obtained, consisting for only a half of BAS.

If a mixture of powders containing alumina with sintering by SPS is used, this leads to melting of the material.

Finally, if a mixture of powders containing aluminium hydroxide with conventional sintering in a tubular oven is used, this also leads to a very heterogeneous sample.

The BAS phase obtained according to the invention is hexagonal and it is possible for the man skilled in the art to carry out a conventional heat treatment for transforming the hexagonal phase into a monoclinic phase.

REFERENCES

[1] S. Boskovic, D. Kosanovic, Dj. Bahloul-Hourlier, P. Thomas, S. J. Kiss "*Formation of celsian from mechanically activated $BaCO_3$-$Al_2O_3$-$SiO_2$ mixtures*", Journal of Alloys and Compounds 290 (1999) 230-230.
[2] J. A Zaykoski, I. G. Talmy "*Gallium and germanium substitutions in Celsian*", Ceram. Eng. Sci. Proc. 15 (9-10) 1994, 779-786.
[3] S. S Amritphale, Avneesh Anshul, Navin Chandra, N. Ramakrishnan «*Development of celsian ceramics from fly ash useful for X-ray radiation-shielding applications*», Journal of the European Ceramic Society 27 (2007) 4639-4647.
[4] A. Allemand, R. Billard, Y. Le Petitcorps "*Matériau composite à matrice en aluminosilicate, notamment en aluminosilicate de baryum 'BAS' renforcée par des renforts en oxyde de métal, et son procédé fabrication*", (Composite material with an aluminosilicate matrix, notably in barium aluminosilicate "BAS" reinforced with metal oxide reinforcements, and its manufacturing method), FR-A1-2998295 and [4A] WO-A1-2014/079837.
[5] C. H. Drummond, N. P. Bansal, "*Crystallization behaviour and properties of BaO $Al_2O_3$ $2SiO_2$ glass matrices*", Ceramic Engineering and Science Proceedings Vol. 11, issue 7-8, pt 1, July 1990.
[6] G. N. Shabanova, V. V. Taranenkova, A. N. Korogodskaya, and E. V. Khristich, "*Structure of the BaO—$Al_2O_3$—$SiO_2$ system (a review)*", Translated from Steklo in Keramika, No. 2, pp. 12-15, February, 2003.
[7] Feng Ye, Limeng Liu, Jingxian Zhang, Qingchang Meng "*Synthesis of 30 wt % BAS/$Si_3N_4$ composite by Spark Plasma Sintering*", Composites Science and Technology 68, 1073-1079, 2008.
[8] A. Kremenovic, Ph. Colomban, B. Piriou, D. Massiot, P. Florian, "*Structural and spectroscopic characterization of the quenched Hexacelsian*", Journal of Physics and Chemistry of Solids 64, 2253-2268, 2003.
[9] Kuo-Tong Lee, Pranesh B. Aswarth "*Enhanced production of celsian barium aluminosilicates by a three step firing process*", Materials Chemistry and Physics 71 (2001) 47-52.
[10] Kuo-Tong Lee, Pranesh B. Aswath "*Synthesis of hexacelsian barium aluminosilicate by a solid state process*"», Journal of the American Ceramic Society, 83 (12) 2907-12, 2000.
[11] I. G Talmy, D. A Haught. "Celsian-based ($BaO.Al_2O_3.2SiO_2$) ceramics as candidates for radomes", Proceedings of the $14^{th}$ conference on metal carbon and ceramic composites, NASA Conf. Publ. 3097 PartI; 1990. p. 239-50.
[12] D. Long-Gonzalez, J. Lopez-Cuevas "*Synthesis of monoclinic Celsian from CFA by using a one step solid state reaction process*" Ceramics International 36 (2010) 661-672.
[13] Nagamine Shogo, Kato Yasuyoshi, Konishi Kunihitko, Tejima Nobue "Production of carrier for combustion catalyst" JP-A-S62-71535 as of Feb. 4, 1987.

The invention claimed is:

1. A method for preparing a material based on an aluminosilicate selected from among barium aluminosilicate BAS, barium and strontium aluminosilicate BSAS, and strontium aluminosilicate SAS, said aluminosilicate consisting of aluminosilicate with a hexagonal structure, the method comprising a single sintering step wherein the sintering of a mixture of powders of precursors of said aluminosilicate, comprising an aluminum hydroxide powder $Al(OH)_3$ is carried out, by a hot sintering technique with a pulsed electric field SPS; whereby a material based on an aluminosilicate, said aluminosilicate consisting of aluminosilicate with a hexagonal structure, is obtained.

2. The method according to claim 1, wherein the powders of precursors other than the aluminium hydroxide powder $Al(OH)_3$ are selected from the group consisting of powders of barium carbonate $BaCO_3$, powders of silica $SiO_2$, and powders of strontium carbonate.

3. The method according to claim 2, wherein the aluminosilicate is barium aluminosilicate BAS, and the mixture of the powders of precursors comprises a mixture of a barium carbonate $BaCO_3$ powder, of a silica powder $SiO_2$, and of an aluminium hydroxide $Al(OH)_3$ powder.

4. The method according to claim 3, wherein the molar ratio of the barium carbonate $BaCO_3$, of the silica powder $SiO_2$, and of the aluminium hydroxide $Al(OH)_3$ powder in the mixture of the powders of precursors is 1 mole of $BaCO_3$ for 2 moles of silica $SiO_2$ and 2 moles of aluminium hydroxide $Al(OH)_3$.

5. The method according to claim 1, wherein the mixture of the powders of precursors is prepared by suspending the powders in a solvent, by homogenizing the suspension, and by drying the suspension.

6. The method according to claim 5, wherein the solvent is selected from among alcohols; water; and mixtures thereof.

7. The method according to claim 6, wherein the solvent is water at a basic pH.

8. A method according to claim 7, wherein the water at a basic pH contains a base.

9. The method according to claim 8, wherein the base is ammonia.

10. The method according to claim 7, wherein the pH of the water is from 10 to 12.

11. The method according to claim 6, wherein the solvent is water at an acid pH.

12. The method according to claim 11, wherein the pH of the water is 4.

13. The method according to claim 6, wherein the solvent is selected from the group consisting of aliphatic alcohols of 1 to 10 C.

14. The method according to claim 1, wherein, during sintering, a first plateau is observed at a first temperature for removing water contained in the aluminium hydroxide $Al(OH)_3$, a second optional plateau is observed at a second temperature for forming intermediate compounds, and a third plateau is observed at a third temperature for forming the aluminosilicate.

15. The method according to claim 14, wherein:
the first plateau is carried out at a temperature from 900° C. to 1,000° C. for a duration from 1 to 5 minutes;
the second plateau is carried out at a temperature from 1,100° C. to 1,200° C. for a duration from 0 to 20 minutes;
the third plateau is carried out at a temperature from 1,200° C. to 1,700° C. for a duration from 1 to 20 minutes.

16. The method according to claim 1, wherein the material based on an aluminosilicate is dense, homogeneous, and non-cracked.

17. The method according to claim 1, which further comprises a step during which the material based on an aluminosilicate, consisting of aluminosilicate with a hexagonal structure, is heat-treated for transforming the aluminosilicate with a hexagonal structure into an aluminosilicate with an orthorhombic structure, or to an aluminosilicate with a monoclinic structure.

18. A method for preparing a composite material, consisting of a matrix made of at least one aluminosilicate, reinforced with reinforcements made of at least a metal oxide or metalloid oxide for which the thermal expansion coefficient is within 10% of the thermal expansion coefficient of said at least one aluminosilicate, wherein the following successive steps are carried out:
a) a material based on an aluminosilicate is prepared by the method according to claim 1, and a powder of said material based on an aluminosilicate is prepared;
b) the powder of the material based on an aluminosilicate is put into contact with reinforcements made of least one metal oxide or metalloid oxide, for which the thermal expansion coefficient is within 10% of the thermal expansion coefficient of the at least one aluminosilicate;
c) sintering of the powder of the material based on an aluminosilicate and of the reinforcements made of at least one metal oxide or metalloid oxide is achieved by a hot sintering method with a pulsed electric field;
d) the sintered powder and reinforcements are cooled;
e) the composite material is recovered.

19. The method according to claim 18, wherein the aluminosilicate is barium aluminosilicate BAS.

20. The method according to claim 18 wherein the reinforcements are made of alumina.

21. The method according to claim 18, wherein the reinforcements made of at least one metal oxide or metalloid oxide appear in one or several form(s) selected from among particles; and fiber fabrics.

22. The method according to claim 21, wherein during step b) a mixture of the powder of the material based on the aluminosilicate and of particles made of at least one metal oxide or metalloid oxide is prepared.

23. The method according to claim 21, wherein during step b) a fiber fabric made of the at least one metal oxide or metalloid oxide is impregnated with a slurry of the powder of the material based on the aluminosilicate.

24. A method for preparing a composite material, consisting of a matrix made of at least one aluminosilicate, reinforced with reinforcements made of at least a metal oxide or metalloid oxide for which the thermal expansion coefficient is within 10% of the thermal expansion coefficient of said at least one aluminosilicate, wherein the following successive steps are carried out:
a) a material based on an aluminosilicate is prepared by the method according to claim 17, and a powder of said material based on an aluminosilicate is prepared;
b) the powder of the material based on an aluminosilicate is put into contact with reinforcements made of least one metal oxide or metalloid oxide, for which the thermal expansion coefficient is within 10% of the thermal expansion coefficient of the at least one aluminosilicate;
c) sintering of the powder of the material based on an aluminosilicate and of the reinforcements made of at least one metal oxide or metalloid oxide is achieved by a hot sintering method with a pulsed electric field;
d) the sintered powder and reinforcements are cooled;
e) the composite material is recovered.

25. The method according to claim 24, wherein the aluminosilicate is barium aluminosilicate BAS.

26. The method according to claim 24, wherein the aluminosilicate consists of an aluminosilicate of monoclinic structure and wherein the reinforcements are made of silica and/or mullite.

27. The method according to claim 24, wherein the reinforcements made of at least one metal oxide or metalloid oxide appear in one or several form(s) selected from among particles; and fiber fabrics.

28. The method according to claim 27, wherein during step b) a mixture of the powder of the material based on the aluminosilicate and of particles made of at least one metal oxide or metalloid oxide is prepared.

29. The method according to claim 27, wherein during step b) a fiber fabric made of at the least one metal oxide or metalloid oxide is impregnated with a slurry of the powder of the material based on the aluminosilicate.

\* \* \* \* \*